(12) United States Patent
Fujita et al.

(10) Patent No.: US 10,808,135 B2
(45) Date of Patent: Oct. 20, 2020

(54) INK-JET INK COMPOSITION FOR PRESSURE-ADHESION RECORDING TARGET MEDIUM AND RECORDED PRODUCT FORMING METHOD

(71) Applicant: Seiko Epson Corporation, Tokyo (JP)

(72) Inventors: Kunihiro Fujita, Shiojiri (JP); Takuya Takahashi, Matsumoto (JP); Yusuke Mizutaki, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/293,921

(22) Filed: Mar. 6, 2019

(65) Prior Publication Data

US 2019/0276693 A1    Sep. 12, 2019

(30) Foreign Application Priority Data

Mar. 7, 2018    (JP) .................. 2018-040839

(51) Int. Cl.
| | |
|---|---|
| *B41J 2/16* | (2006.01) |
| *C09D 11/322* | (2014.01) |
| *B41M 5/00* | (2006.01) |
| *C09D 11/102* | (2014.01) |
| *C09D 11/033* | (2014.01) |
| *C09D 11/107* | (2014.01) |
| *C09D 11/037* | (2014.01) |

(52) U.S. Cl.
CPC ......... *C09D 11/322* (2013.01); *B41M 5/0023* (2013.01); *C09D 11/033* (2013.01); *C09D 11/037* (2013.01); *C09D 11/102* (2013.01); *C09D 11/107* (2013.01)

(58) Field of Classification Search
None
See application file for complete search history.

(56) References Cited

U.S. PATENT DOCUMENTS

| | | | |
|---|---|---|---|
| 2002/0025418 A1* | 2/2002 | Ishibashi | B41M 3/14 428/211.1 |
| 2004/0082686 A1 | 4/2004 | Takahashi et al. | |
| 2005/0235874 A1* | 10/2005 | Nakamura | C09B 69/00 106/493 |
| 2014/0285591 A1* | 9/2014 | Denda | B41J 2/17533 347/86 |
| 2015/0267067 A1* | 9/2015 | Ueki | C09D 11/10 347/20 |
| 2018/0298214 A1 | 10/2018 | Takahashi et al. | |

FOREIGN PATENT DOCUMENTS

| | | |
|---|---|---|
| JP | 2001-164158 A | 6/2001 |
| JP | 2018-177943 A | 11/2018 |

* cited by examiner

*Primary Examiner* — Erica S Lin

(74) *Attorney, Agent, or Firm* — Harness, Dickey & Pierce, P.L.C.

(57) ABSTRACT

Provided is an ink-jet ink composition for a pressure-adhesion recording target medium. The ink-jet ink composition contains a pigment, a resin, an organic solvent, a surfactant, and water.

17 Claims, 1 Drawing Sheet

INK-JET INK COMPOSITION FOR PRESSURE-ADHESION RECORDING TARGET MEDIUM AND RECORDED PRODUCT FORMING METHOD

BACKGROUND

1. Technical Field

The present invention relates to an ink-jet ink composition for a pressure-adhesion recording target medium and to a recorded product forming method.

2. Related Art

Ink jet recording methods enable recording of a high-resolution image by a relatively simple apparatus, and are quickly developed in various fields. Among these, for example, various studies have been made on recording methods for pressure-adhesion recording target media.

JP-A-2016-180033 discloses that an aqueous ink-jet ink composition containing an anionic group-containing resin-coated pigment, an emulsion, a water-soluble solvent, and water is used for a peelable pressure-adhesion recording sheet. This document discloses setting the glass transition temperature of resin of the emulsion contained in the ink composition to −30 to +30° C., the content of the emulsion to 0.7 to 7.0% by mass, and the ratio of the water-soluble solvent to 25 to 55% by mass. Further, this document discloses that, as a result of this, excellent peeling resistance of printed characters and excellent ejection stability of the ink are achieved. In Examples of this document, the peeling resistance of printed characters is evaluated as follows. That is, a predetermined recording paper sheet is colored by the ink composition described above, and a sheet is produced by performing pressure adhesion of a colored surface and a non-colored surface superposed on each other. Next, the pressure-adhered surfaces of the produced sheet are peeled apart, and the peeling resistance is evaluated by calculating a degree of transfer of color from the colored surface to the non-colored surface after the pressure adhesion.

However, no study has been made on imparting excellent transfer resistance in the peeling, excellent color developing properties, and excellent intermittent printing capability to any ink composition of JP-A-2016-180033 in a good balance.

SUMMARY

An advantage of some aspects of the invention is to provide an ink-jet ink composition for a pressure-adhesion recording target medium having excellent transfer resistance in the peeling, excellent color developing properties, and excellent intermittent printing capability in a good balance and a recording method.

The present inventors have carried out intensive studies to achieve the advantage described above. As a result of this, the present inventors have found that the advantage described above can be achieved by using an ink-jet ink composition having a predetermined composition, and thus completed the invention.

That is, aspects of the invention are as follows.

[1] An ink-jet ink composition for a pressure-adhesion recording target medium, the ink-jet ink composition containing a pigment, a resin, an organic solvent, a surfactant, and water, wherein the content of the pigment is 5.7% by mass or more with respect to the entirety of the ink-jet ink composition, wherein the total content of the pigment and the resin is 10.3% by mass or less with respect to the entirety of the ink-jet ink composition, wherein the content of the organic solvent is 5% by mass or more and 20% by mass or less with respect to the entirety of the ink-jet ink composition, and wherein the resin satisfies a condition (a) or (b) below (a) the resin contains a styrene-acrylic resin having a glass transition temperature of 36° C. or lower, and the content of the styrene-acrylic resin is 70 parts by mass or more with respect to 100 parts by mass of the pigment (b) the resin contains a urethane-based resin having a glass transition temperature of 36° C. or lower, and the content of the urethane-based resin is 55 parts by mass or more with respect to 100 parts by mass of the pigment.

[2] The ink-jet ink composition for a pressure-adhesion recording target medium according to [1], wherein the pigment contains an anionic self-dispersive pigment having an anionic functional group on a surface thereof.

[3] The ink-jet ink composition for a pressure-adhesion recording target medium according to [1] or [2], wherein the organic solvent contains an alkanediol having 6 to 8 carbon atoms and propylene glycol, wherein the content of the alkanediol is 0.5% by mass or more and 5.0% by mass or less with respect to the entirety of the ink-jet ink composition, and wherein the content of the propylene glycol is 0.5% by mass or more and 5.0% by mass or less with respect to the entirety of the ink-jet ink composition.

[4] The ink-jet ink composition for a pressure-adhesion recording target medium according to any one of [1] to [3], wherein the organic solvent contains a monoalkyl ether of polyol, and wherein the content of the monoalkyl ether is 0.5% by mass or more and 5.0% by mass or less with respect to the entirety of the ink-jet ink composition.

[5] The ink-jet ink composition for a pressure-adhesion recording target medium according to anyone of [1] to [4], wherein the surfactant contains an acetylene-based surfactant.

[6] A recorded product forming method including attaching the ink-jet ink composition for a pressure-adhesion recording target medium according to any one of [1] to [5] to a recording target medium by an ink jet system to form an image, and sticking together, by pressure-sensitive pressure adhesion, a pair of surfaces including an image-formed surface of the recording target medium on which the image has been formed by the attaching to form a recorded product in which the image is concealed from an outside.

[7] The recorded product forming method according to [6], wherein a pressure-sensitive adhesion layer is formed on at least one of the pair of surfaces, and the pressure-sensitive adhesion layer contains at least one of a polyvalent metal salt and a cationic resin.

[8] The recorded product forming method according to [7], wherein the polyvalent metal salt contains magnesium sulfate, and the cationic resin contains a polyamine epichlorohydrin resin.

BRIEF DESCRIPTION OF THE DRAWINGS

The invention will be described with reference to the accompanying drawing, wherein like numbers reference like elements.

DESCRIPTION OF EXEMPLARY EMBODIMENTS

Figure 1:
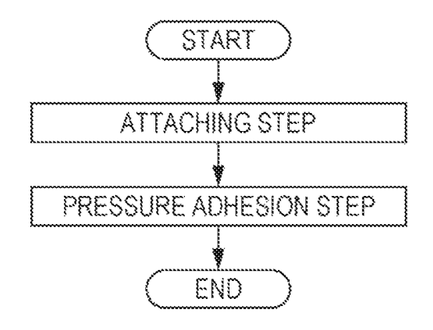
FIGURE is a flowchart showing an example of a recording method according to an embodiment.

Although an embodiment of the invention (hereinafter referred to as the "present embodiment") will be described below in detail, the invention is not limited to this and can be modified in various ways within the gist of the invention.

In this description, "intermittent printing capability" refers to capability of stably ejecting the ink-jet ink composition even when a time between temporarily stopping ejection and starting next ejection is long in the case of ejecting the ink-jet ink composition through a nozzle by an ink jet system.

Ink-Jet Ink Composition for Pressure-Adhesion Recording Target Medium

An ink-jet ink composition for a pressure-adhesion recording target medium of the invention contains a pigment, a resin, an organic solvent, a surfactant, and water. The content of the pigment is 5.7% by mass or more with respect to the entirety of the ink-jet ink composition. The total content of the pigment and the resin is 10.3% by mass or less with respect to the entirety of the ink-jet ink composition. The content of the organic solvent is 5% by mass or more and 20% by mass or less with respect to the entirety of the ink-jet ink composition. The resin satisfies a condition (a) or (b) below. (a) The resin contains a styrene-acrylic resin having a glass transition temperature of 36° C. or lower, and the content of the styrene-acrylic resin is 70 parts by mass or more with respect to 100 parts by mass of the pigment. (b) The resin contains a urethane-based resin having a glass transition temperature of 36° C. or lower, and the content of the urethane-based resin is 55 parts by mass or more with respect to 100 parts by mass of the pigment.

The ink-jet ink composition of the present embodiment can satisfy excellent transfer resistance in the peeling, excellent color developing properties, and excellent intermittent printing capability in a good balance as a result of having the configuration described above. Reasons for this can be considered as follows, but are not limited to what is described below. First, the ink-jet ink composition of the present embodiment is excellent in transfer resistance as a result of setting the glass transition temperature of the resin to a predetermined value or lower and setting the content ratio of the resin to the pigment to a predetermined value or higher. The ink-jet ink composition of the present embodiment has excellent color developing properties as a result of setting the content of the pigment in the ink-jet ink composition to a predetermined value or higher. In addition, the ink-jet ink composition of the present embodiment can suppress excessive increase of viscosity of the ink-jet ink composition and suppress decrease of an amount of ink ejection caused by the increase of viscosity as a result of setting the total content of the pigment and the resin in the ink-jet ink composition to a predetermined value or lower and setting the content of the organic solvent to a predetermined value or lower. As described above, the ink-jet ink composition of the present embodiment has excellent color developing properties as a result of the amount of ink ejection not decreasing and thus ejecting the ink-jet ink composition of a predetermined amount onto a pressure-adhesion recording target medium being possible. Further, the ink-jet ink composition of the present embodiment has excellent intermittent printing capability as a result of setting the total content of the pigment and the resin, which are solid components in the ink-jet ink composition to a predetermined value or lower and setting the content of the organic solvent in the ink-jet ink composition to a predetermined value or lower.

Pigment

The pigment of the invention is not particularly limited, and examples thereof include No. 2300, No. 900, MCF88, No. 33, No. 40, No. 45, No. 52, MA7, MA8, MA100, No. 2200B, and so forth (manufactured by Mitsubishi Chemical Corporation), Raven 5750, Raven 5250, Raven 5000, Raven 3500, Raven 1255, Raven 700, and so forth (manufactured by Columbia Carbon), Regal 400R, Regal 330R, Regal 660R, Mogul L, Monarch 700, Monarch 800, Monarch 880, Monarch 900, Monarch 1000, Monarch 1100, Monarch 1300, Monarch 1400, and so forth (manufactured by Cabot Corporation), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (manufactured by Degussa). These pigments are used alone or in combination of two or more kinds.

The pigment may be of a polymer-dispersive type or a self-dispersive type. The polymer-dispersive pigment of the polymer-dispersive type is not particularly limited as long as the pigment can be dispersed in an aqueous solvent due to polymer. Examples of the polymer-dispersive pigment include a pigment whose surface is entirely or partially coated by polymer.

Among these, it is preferable that the pigment is a self-dispersive pigment of a self-dispersive type from the viewpoint of better dispersion stability. The "self-dispersive pigment" in this description refers to a pigment having a hydrophilic group on the surface thereof to be dispersed in an aqueous solvent. The self-dispersive pigment is obtained by bonding a hydrophilic group directly or indirectly to the surface of the pigment by known physical or chemical treatment. Although the hydrophilic group is not particularly limited, examples of the hydrophilic group include one or more hydrophilic groups represented by a chemical formula selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$. In the chemical formulae, M represents a hydrogen atom, an alkali metal, ammonium, a phenyl group that can have a substituent, or organic ammonium, and R represents an alkyl group having 1 to 12 carbon atoms or an aryl group that has 1 to 12 carbon atoms and can have a substituent. Examples of the aryl group include a phenyl group and a naphthyl group.

Among these, the hydrophilic group is preferably an anionic functional group from the viewpoint of improving transfer resistance, color developing properties, and intermittent printing capability in a good balance. That is, the pigment preferably contains an anionic self-dispersive pigment having an anionic functional group on the surface thereof. The anionic functional group is not particularly limited as long as the anionic functional group is negatively charged in an aqueous solvent, and examples thereof include a carboxyl group, a sulfonic group, a phosphoric group, and a phosphoric group. In addition, the anionic functional group may be in a form of salt such as an ammonium salt or a metal salt.

The self-dispersive pigment may be prepared in a known method, or a product on the market may be used. For example, the self-dispersive pigment is obtained by bonding a hydrophilic group directly or indirectly to the surface of the pigment by known physical or chemical treatment. Examples of the physical treatment include vacuum plasma treatment. Examples of the chemical treatment include a wet oxidation method of performing oxidation by using an oxidizing agent in water, and a method of bonding a carboxyl group via a phenyl group by bonding p-aminobenzoic acid to the surface of the pigment. The product on the market is not particularly limited, and examples thereof include "CAB-O-JET (registered trademark) 200", "CAB-O-JET (registered trademark) 250C", "CAB-O-JET (registered trademark) 260M", "CAB-O-JET (registered trademark) 400", "CAB-O-JET (registered trademark) 300", "CAB-O-JET (registered trademark) 400", "CAB-O-JET (registered trademark) 450C", "CAB-O-JET (registered trademark) 465M", and "CAB-O-JET (registered trademark) 470Y" manufactured by Cabot Corporation, and "BONJET (registered trademark) BLACK CW-1" and "BONJET (registered trademark) BLACK CW-2" manufactured by ORIENT CHEMICAL INDUSTRIES CO., LTD.

The content of the pigment is 5.7% by mass or more with respect to the entirety of the ink-jet ink composition. The upper limit of the content of the pigment is not limited as long as the upper limit does not exceed an upper limit of the total content of the pigment and the resin that will be described later. The content of the pigment is, for example, 5.7% by mass or more and 7.0% by mass or less, and is preferably 5.7% by mass or more and 6.0% by mass or less. As a result of the content of the pigment being 5.7% by mass or more, the ink-jet ink composition of the present embodiment has excellent color developing properties. From the same viewpoint, the content of the pigment is preferably 5.8% by mass or more.

Resin

The resin of the present embodiment contains a styrene-acrylic resin having a glass transition temperature of 36° C. or lower and/or a urethane-based resin having a glass transition temperature of 36° C. or lower. In this description, the styrene-acrylic resin having a glass transition temperature of 36° C. or lower will be also described as a "specific styrene-acrylic resin". In addition, the urethane-based resin having a glass transition temperature of 36° C. or lower will be also described as a "specific urethane-based resin".

Specific Styrene-Acrylic Resin

Examples of the styrene-acrylic resin of the present embodiment include a copolymer of a styrene-based monomer and an acrylic monomer. Examples of the styrene-based monomer include styrene, α-methylstyrene, p-methoxystyrene, p-hydroxystyrene, and p-acetoxystyrene. Examples of the acrylic monomer include (meth)acrylic acid; alkyl (meth)acrylates such as methyl (meth)acrylate, ethyl (meth)acrylate, butyl (meth)acrylate, and 2-ethylhexyl (meth)acrylate; hydroxyl group-containing (meth)acrylates such as hydroxyethyl (meth)acrylate; amino group-containing (meth)acrylates such as dimethylaminoethyl (meth)acrylate; and glycidyl group-containing (meth)acrylates such as glycidyl (meth)acrylate. In addition, the styrene-acrylic resin of the present embodiment may be a copolymer of a styrene-based monomer, an acrylic monomer, and another monomer. Examples of the other monomer include monomers copolymerizable with the styrene-based monomer and the acrylic monomer. More specifically, examples thereof include nitrile-based monomers such as acrylonitrile, vinyl esters such as vinyl acetate, vinyl ethers such as vinyl ethyl ether, and unsaturated carboxylic acids and anhydrides thereof.

The styrene-acrylic resin is preferably in a form of emulsion from the viewpoint of further reducing the viscosity. Examples of the type of the emulsion include an emulsion polymerization type, a forced emulsification type, and a self emulsification type.

The glass transition temperature of the styrene-acrylic resin of the present embodiment is 36° C. or lower, and is, for example, −30° C. or higher and 36° C. or lower. As a result of the glass transition temperature being 36° C. or lower, the ink-jet ink composition of the present embodiment has excellent transfer resistance. From the same viewpoint, the glass transition temperature is preferably 35° C. or lower, more preferably 30° C. or lower, further preferably 20° C. or lower, and particularly preferably 15° C. or lower.

The glass transition temperature (Tg) of the styrene-acrylic resin is a theoretical glass transition temperature obtained by the Wood's formula below.

Wood's formula: $1/Tg = W_1/Tg_1 + W_2/Tg_2 + \ldots + W_x/Tg_x$ (In the formula, $Tg_1$ to $Tg_x$ respectively represent glass transition temperatures of respective homopolymers of monomers 1, 2, ... x constituting the copolymer, $W_1$ to $W_x$ respectively represent polymerization fractions of the monomers 1, 2, ... x, Tg represents a theoretical glass transition temperature, and the glass transition temperatures in the Wood's formula are absolute temperatures.)

The styrene-acrylic resin of the present embodiment may be prepared by a known method, or a product on the market may be used. Examples of the known method include the following. That is, a reaction vessel equipped with a dripping apparatus, a thermometer, a water-cooling circulation condenser, and a stirrer is prepared, deionized water is charged into the reaction vessel, and ammonium persulfate that is a polymerization initiator is added thereto while stirring the reaction vessel in a nitrogen atmosphere at 70° C. Then, a monomer solution containing styrene and acrylic acid is prepared. The monomer solution is dripped into the reaction vessel to start polymerization, and thus the resin is obtained.

The glass transition temperature of the styrene-acrylic resin can be adjusted by, for example, modifying the copolymerization of the styrene-based monomer and the acrylic monomer.

The content of the styrene-acrylic resin is, with respect to 100 parts by mass of the pigment, 70 parts by mass or more, and is, for example, 70 parts by mass or more and 80 parts by mass or less. As a result of the content being 70 parts by mass or more, the ink-jet ink composition of the present embodiment has excellent transfer resistance. From the same viewpoint, the content is preferably 71 parts by mass or more, more preferably 72 parts by mass or more, and further preferably 73 parts by mass or more.

Urethane-Based Resin

Examples of the urethane-based resin of the present embodiment include polyether-based polyurethane resin, polyester-based polyurethane resin, and polycarbonate-based polyurethane resin.

The urethane-based resin is preferably in a form of emulsion from the viewpoint of further reducing the viscosity. Examples of the type of the emulsion include an emulsion polymerization type, a forced emulsification type, and a self emulsification type.

The glass transition temperature of the urethane-based resin of the present embodiment is 36° C. or lower, and is, for example, −30° C. or higher and 36° C. or lower. As a result of the glass transition temperature being 36° C. or lower, the ink-jet ink composition of the present embodiment has excellent transfer resistance. From the same viewpoint, the glass transition temperature is preferably 35° C. or lower, more preferably 30° C. or lower, further preferably 20° C. or lower, and particularly preferably 15° C. or lower.

The glass transition temperature (Tg) of the urethane-based resin can be measured by differential scanning calorimetry in accordance with JIS K7121.

The urethane-based resin of the present embodiment may be prepared in a known method, or a product on the market may be used. Examples of the product on the market include "ETERNACOLL (registered trademark) UW series" manufactured by Ube Industries, Ltd., "SUPERFLEX series" manufactured by Daiichi Kogyo Co., Ltd., "NEOSTECKER" and "EVAFANOL series" manufactured by Nicca Chemical Co., Ltd., "HYDRAN series" manufactured by DIC Corporation, and "NeoRez series" manufactured by Kusumoto Chemicals, Ltd.

The content of the urethane-based resin is, with respect to 100 parts by mass of the pigment, 55 parts by mass or more, and is, for example, 55 parts by mass or more and 70 parts by mass or less. As a result of the content of the urethane-based resin being 55 parts by mass or more, the ink-jet ink composition of the present embodiment has excellent transfer resistance. From the same viewpoint, the content of the urethane-based resin is preferably 58 parts by mass or more, and more preferably 60 parts by mass or more.

The resin of the present embodiment may contain another resin different from the styrene-acrylic resin and the urethane-based resin as long as the effect of the invention is not hindered. Examples of the other resin include polyester-based resin, polyvinyl acetate-based resin, polyvinyl chloride-based resin, polybutadiene-based resin, and polyethylene-based resin. These other resins are used alone or in combination of two or more kinds.

The content of the other resin with respect to the total amount of resin of the present embodiment is preferably 10% by mass or less, more preferably 5% by mass or less, and further preferably 1% by mass or less from the viewpoint of more effectively and more reliably achieving the effect of the invention.

The total content of the pigment and the resin is 10.3% by mass or less with respect to the entirety of the ink-jet ink composition, and is, for example, 8.0% by mass or more and 10.3% by mass or less. When the total content of the pigment and the resin is 10.3% by mass or less, the viscosity of the ink is appropriate without being too high, and thus a sufficient amount of ink can be ejected. As a result of this, a sufficient amount of pigment can be attached to the recording target medium, and thus a recorded product having excellent color developing properties can be manufactured. From the same viewpoint, the total content of the pigment and the resin is preferably 10.2% by mass or less, more preferably 10.1% by mass or less, and further preferably 10.0% by mass or less.

Organic Solvent

The organic solvent of the present embodiment is not particularly limited, and examples thereof include non-protonic polar solvents, monoalcohols, alkyl polyols, and alkyl ethers of polyols. These organic solvents are used alone or in combination of two or more kinds.

The non-protonic polar solvents are not particularly limited, and examples thereof include pyrrolidones such as 2-pyrrolidone, imidazolidinones, sulfoxides, lactones, amide ethers, and imidazoles.

The monoalcohols are not particularly limited, and examples thereof include methanol, ethanol, and n-propylalcohol.

The alkylpolyols are not particularly limited, and examples thereof include glycerol, ethylene glycol, diethylene glycol, triethylene glycol, and alkanediols.

The alkanediols are not particularly limited, and examples thereof include propylene glycol (1,2-propanediol), dipropylene glycol, 1,3-propylene glycol (1,3-propanediol), isobutylene glycol (2-methyl-1,2-propanediol), 1,2-butanediol, 1,3-butanediol, 1,4-butanediol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, and 1,8-octanediol.

The alkyl ethers of polyols of the present embodiment are not particularly limited, and examples thereof include dialkyl ethers of polyols, and monoalkyl ethers of polyols.

The dialkyl ethers of polyols are not particularly limited, and examples thereof include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

The monoalkyl ethers of polyols are not particularly limited, and examples thereof include ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Among these, the organic solvent preferably contains one or more kinds of alkanediols and alkyl ethers of polyols, more preferably contains one or more selected from the group consisting of propylene glycol, alkanediols having 6 to 8 carbon atoms, and monoalkyl ethers of polyols, and further preferably contains both of propylene glycol and an alkanediol having 6 to 8 carbon atoms and/or a monoalkyl ether of a polyol, from the viewpoint of further improving the color developing properties and intermittent printing capability in a good balance.

The content of the organic solvent is 5% by mass or more and 20% by mass or less with respect to the entirety of the ink-jet ink composition. As a result of the content of the organic solvent being 5% by mass or more, the ink-jet ink composition of the present embodiment has excellent dispersion stability of pigment. From the same viewpoint, the content of the organic solvent is preferably 8% by mass or more, more preferably 10% by mass or more, and further preferably 15% by mass or more. As a result of the content of the organic solvent being 20% by mass or less, excellent color developing properties and intermittent printing capability can be achieved. From the same viewpoint, the content of the organic solvent is preferably 19% by mass or less, and more preferably 18% by mass or less.

In the case where the organic solvent contains an alkanediol having 6 to 8 carbon atoms and propylene glycol, the content of the alkanediol is preferably 0.5% by mass or more and 5.0% by mass or less with respect to the entirety of the ink-jet ink composition, and the content of the propylene glycol is preferably 0.5% by mass or more and 5.0% by mass or less with respect to the entirety of the ink-jet ink composition. As a result of the content of the alkanediol and the content of the propylene glycol respectively being within the ranges described above, there is a tendency that the color developing properties and intermittent printing capability can be further improved in a good balance. From the same viewpoint, the lower limit value of each content is more preferably 0.6% by mass and further preferably 0.7% by mass, and the upper limit value of each content is more preferably 2.5% by mass and further preferably 2.0% by mass.

In the case where the organic solvent contains a monoalkyl ether of polyol, the content of the monoalkyl ether is preferably 0.5% by mass or more and 5.0% by mass or less with respect to the entirety of the ink-jet ink composition. As a result of the content of the monoalkyl ether being within the range described above, there is a tendency that the color developing properties and intermittent printing capability can be further improved in a good balance. From the same viewpoint, the lower limit value of the content of the monoalkyl ether is more preferably 0.6% by mass and further preferably 0.7% by mass, and the upper limit value of the content of the monoalkyl ether is more preferably 2.5% by mass and further preferably 2.0% by mass.

Surfactant

The surfactant of the present embodiment is not particularly limited, and examples thereof include acetylene glycol-based surfactants, fluorine-based surfactants, and silicone-based surfactants. Among these, the surfactant is preferably an acetylene glycol-based surfactant from the viewpoint of further improving the color developing properties and intermittent printing capability in a good balance.

The acetylene glycol-based surfactant is not particularly limited, and, for example, one or more selected from the group consisting of 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol is preferably used. Products of the acetylene glycol-based surfactant on the market are not particularly limited, and examples thereof include OLFINE 104 series and E series such as OLFINE E1010 (manufactured by Air Products Limited), and SURFYNOL 465 and SURFYNOL 61 (manufactured by Nissin Chemical Industry Co., Ltd.). The acetylene glycol-based surfactants may be used alone or in combination of two or more kinds.

The fluorine-based surfactants are not particularly limited, and examples thereof include perfluoroalkyl sulfonic acid salts, perfluoroalkyl carboxylic acid salts, perfluoroalkyl phosphoric acid esters, perfluoroalkylethylene oxide adducts, perfluoroaklylbetaines, and perfluoroalkylamine oxide compounds. Products of the fluorine-based surfactants on the market are not particularly limited, and examples thereof include S-144 and S-145 (manufactured by AGC Inc.); FC-170C, FC-430, and Fluorad-FC4430 (manufactured by Sumitomo 3M); FSO, FSO-100, FSN, FSN-100, and FS-300 (manufactured by Dupont); and FT-250 and 251 (manufactured by NEOS COMPANY LIMITED). The fluorine-based surfactants are used alone or in combination of two or more kinds.

The silicone-based surfactants are not particularly limited, and examples thereof include polysiloxane-based compounds and polyether-modified organosiloxanes. Products of the silicone-based surfactants on the market are not particularly limited, and examples thereof include BYK-306, BYK-307, BYK-333, BYK-341, BYK-345, BYK-346, BYK-347, BYK-348, and BYK-349 (manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (manufactured by Shin-Etsu Chemical Co., Ltd.). The silicone-based surfactants are used alone or in combination of two or more kinds.

The content of the surfactant is preferably 0.15 to 2.5% by mass, more preferably 0.25 to 2.0% by mass, and further preferably 0.50 to 1.5% by mass with respect to the entirety of the ink-jet ink composition from the viewpoint of further improving the color developing properties and intermittent printing capability in a good balance.

The HLB value of the surfactant is preferably 4 or more. As a result of the HLB value being 4 or more, the ink-jet ink composition of the present embodiment has more excellent color developing properties. From the same viewpoint, it is preferable to use a surfactant having an HLB value of 4 or more and 6 or less and a surfactant having an HLB value of 10 or more and 15 or less in combination. Here, "HLB" is abbreviation of Hydrophile-Lipophile Balance, and the HLB value is an indicator of a balance between hydrophilic groups and lipophilic groups in the molecule of the surfactant. The HLB value described above is a value calculated by the Griffin's method.

Water

The water of the present embodiment is not particularly limited, and examples thereof include pure water and ultrapure water such as deionized water, ultrafiltrated water, water filtered by a reverse osmosis membrane, and distilled water.

The content of the water may be, for example, about 67 to 85% by mass with respect to the ink-jet ink composition.

The ink-jet ink composition of the present embodiment is used for a pressure-adhesion recording target medium. In this description, "pressure-adhesion recording target medium" refers to a medium used in such a form that a pair of surfaces including an image-formed surface on which an image has been formed are stuck together by pressure-sensitive pressure adhesion to conceal the image from the outside. To be noted, as will be described later, the recording medium to which the ink-jet ink composition of the present embodiment is to be attached by the ink jet system is not necessarily a pressure-adhesion recording target medium.

Recording Method

The recorded product forming method of the present embodiment includes an attaching step of attaching the ink-jet ink composition for a pressure-adhesion recording target medium of the present embodiment to a recording target medium by an ink jet system to form an image, and a pressure adhesion step of sticking together, by pressure-sensitive pressure adhesion, a pair of surfaces including an image-formed surface of the recording target medium on which the image has been formed in the attaching step to form a recorded product in which the image is concealed from the outside. FIGURE is a flowchart showing an example of the recorded product forming method according to the present embodiment. According to the recorded product forming method of the present embodiment, since the ink-jet ink composition of the present embodiment is attached to a predetermined surface by an ink jet system in the attaching step, excellent transfer resistance at the time of peeling apart the surfaces stuck in the pressure adhesion step is achieved. In addition, according to the recorded product forming method of the present embodiment, since the ink-jet ink composition of the present embodiment is attached to a predetermined surface by an ink jet system in the attaching step, excellent color developing properties and intermittent printing capability are achieved.

Attaching Step

In the attaching step of the present embodiment, an image is formed by attaching the ink-jet ink composition for a pressure-adhesion recording target medium of the present embodiment to a recording target medium by an ink jet system. The ink jet system mentioned herein is a system employed in a typical ink jet printer in which an image is formed by ejecting an ink through a nozzle to attach the ink to the recording target medium.

The recording target medium used in this step may be a pressure-adhesion recording target medium including a base material and a pressure-sensitive adhesion layer formed on a part or the whole of the surface of the base material, or a recording target medium that is normally used, that is, a recording target medium in which the pressure-sensitive adhesion layer is not formed on the surface of the base material. Examples of the base material include base paper, and examples of the base paper include Kraft paper, form paper, high-quality paper, medium-quality paper, and optical character recognition (OCR) paper.

The pressure-sensitive adhesion layer preferably contains at least one kind of polyvalent metal salts and cationic resins from the viewpoint of further improving the color developing properties. The polyvalent metal salts are not particularly limited, and examples thereof include polyvalent metal salts of organic acids or inorganic acids. Examples of the organic acids or inorganic acids include carboxylic acids (formic acid, acetic acid, benzoic acid, and so forth), sulfuric acid, nitric acid, hydrochloric acid, and thiocyanic acid. The polyvalent metal salts are not particularly limited, and examples thereof include salts of alkaline earth metals (for example, magnesium and calcium) which are in group 2 of the periodic table, transition metals (for example, lanthanum) of group 3 of the periodic table, and earth metals (for example, aluminum) of group 13 of the periodic table, and lanthanoids (for example, neodymium). Among these, the polyvalent metal salts of organic acids or inorganic acids are preferably calcium salts or magnesium salts of carboxylic acids (formic acid, acetic acid, benzoic acid, and so forth), calcium salts or magnesium salts of sulfuric acid, calcium salts or magnesium salts of nitric acid, calcium chloride, magnesium chloride, and calcium salts or magnesium salts of thiocyanic acid, and more preferably magnesium sulfate, from the viewpoint of further improving the color developing properties. The polyvalent metal salts of organic acids or inorganic acids are used alone or in combination of two or more kinds.

The cationic resins are not particularly limited, and examples thereof include polyamine epichlorohydrin resins, polyallylamine, poly(vinylpyridine), polyalkylaminoethyl acrylate, polyalkylaminoethyl methacrylate, poly(vinylimidazole), poly(glucosamin), polyethyleneimine, polybiguanide, polyhexamethylene guanide, and polyguanide. These cationic resins may be primary, secondary, and tertiary amine salt-type compounds, alkylamine salts, dialkylamine salts, aliphatic amine salts, benzalkonium salts, quaternary ammonium salts, quaternary alkylammonium salts, alkylpyridinium salts, imidazolium salts, sulfonium salts, phosphonium salts, and onium salts. Among these, the cationic resin is preferably a polyamine epichlorohydrin resin from the viewpoint of further improving the color developing properties. These cationic resins are used alone or in combination of two or more kinds.

The pressure-sensitive adhesion layer of the present embodiment may further contain a non-peelable pressure-sensitive adhesive, fine particle filler, and binder as constituent components thereof. Specific examples and mixing amounts of the constituent components and the production method of the pressure-sensitive adhesion layer are exemplified in, for example, JP-A-2014-104642.

Pressure Adhesion Step

In the pressure adhesion step of the present embodiment, the pair of surfaces including the image-formed surface of the recording target medium on which the image has been formed in the attaching step are stuck together by pressure-sensitive pressure adhesion, and thus a recorded product in which the image is concealed from the outside is formed. In this step, at least one of the pair of surfaces may be the image-formed surface described above, and both of the pair of surfaces may be image-formed surfaces. The pair of surfaces may share one recording target medium, or may be constituted by surfaces of different recording target media. In addition, the pressure-sensitive adhesion layer may be formed on at least one of the pair of surfaces, and, in this case, the pair of surfaces can be stuck together via the pressure-sensitive adhesion layer. The pressure-sensitive adhesion layer may be formed on one of the pair of surfaces, or formed on both of the pair of surfaces. As a result of this, in this step, a recorded product in which the image formed in the attaching step is concealed from the outside can be formed. As a method for the pressure adhesion, a known method can be used.

Examples

The invention will be described in detail by using Examples and Comparative Examples. The invention should not be limited in any way by the following examples.

Materials for Ink-Jet Ink Composition

Main materials used for the ink-jet ink composition used in Examples and Comparative Examples below are as follows.

Pigment
"CAB-O-JET 300" manufactured by Cabot Corporation
Resin
Resins A to F: synthetic resin
Resin G: "UW-1527NF" manufactured by Ube Industries, Ltd.
Resin H: "SUPERFLEX 150" manufactured by Daiichi Kogyo Co., Ltd.
To be noted, for the resins A to F, a copolymerization ratio between styrene-based monomers and acrylic monomers was adjusted such that glass transition temperatures shown in Table 1 were realized.
Surfactant
SURFYNOL: SURFYNOL 104PG50 manufactured by Nissin Chemical Industry Co., Ltd. (acetylene-based surfactant having an HLB of 4)
OLFINE: OLFINE E1010 Nissin Chemical Industry Co., Ltd. (acetylene-based surfactant having an HLB of 13 to 14)
Preparation of Ink-Jet Ink Composition The materials were mixed in the compositions shown in Table 1 below, the mixture was sufficiently stirred, and thus respective ink-jet ink compositions were obtained. In Table 1 below, the unit of the values is parts by mass, and the total amount of the ink-jet ink composition is 100.0 parts by mass. The amounts of the pigment and the resin are in terms of solids.

TABLE 1

|  |  | Example |  |  |  |  |  |  |  | Comparative Example |  |
|---|---|---|---|---|---|---|---|---|---|---|---|
|  |  | 1 | 2 | 3 | 4 | 5 | 6 | 7 | 8 | 1 | 2 |
| Pigment |  | 5.8 | 5.8 | 5.8 | 6 | 5.8 | 5.8 | 5.8 | 5.8 | 5.8 | 5.8 |
| Styrene-acrylic resin | Resin A (TG-5° C.) | 4.1 | 4.2 | 4.5 | 4.3 | — | — | — | — | 3.5 | 4.7 |
|  | Resin B (TG10° C.) | — | — | — | — | 4.2 | — | — | — | — | — |
|  | Resin C (TG36° C.) | — | — | — | — | — | 4.2 | — | — | — | — |
|  | Resin D (TG60° C.) | — | — | — | — | — | — | — | — | — | — |
|  | Resin E (TG80° C.) | — | — | — | — | — | — | — | — | — | — |
|  | Resin F (TG100° C.) | — | — | — | — | — | — | — | — | — | — |
| Urethane-based resin | Resin G (TG-30° C.) | — | — | — | — | — | — | 3.2 | 3.7 | — | — |
|  | Resin H (TG40° C.) | — | — | — | — | — | — | — | — | — | — |
| Organic solvent | Triethylene glycol monobutyl ether | 2 | 2 | 2 | 2 | 2 | 2 | 2 | 2 | 2 | 2 |
|  | 1,2-hexanediol | 1.8 | 1.8 | 1.8 | 1.8 | 1.8 | 1.8 | 1.8 | 1.8 | 1.8 | 1.8 |
|  | 2-pyrrolidone | 3 | 3 | 3 | 3 | 3 | 3 | 3 | 3 | 3 | 3 |
|  | Triethylene glycol | 3 | 3 | 3 | 3 | 3 | 3 | 3 | 3 | 3 | 3 |
|  | Glycerol | 7 | 7 | 7 | 7 | 7 | 7 | 7 | 7 | 7 | 7 |
|  | Propylene glycol | 0.9 | 0.9 | 0.9 | 0.9 | 0.9 | 0.9 | 0.9 | 0.9 | 0.9 | 0.9 |
| Surfactant | SURFYNOL OLFINE | 0.2 1 | 0.2 1 | 0.2 1 | 0.2 1 | 0.2 1 | 0.2 1 | 0.2 1 | 0.2 1 | 0.2 1 | 0.2 1 |
| Water |  | Remainder | Remainder | Remainder | Remainder | Remainder | Remainder | Remainder | Remainder | Remainder | Remainder |
| Total amount of pigment and resin |  | 9.9 | 10 | 10.3 | 10.3 | 10 | 10 | 9 | 9.5 | 9.3 | 10.5 |
| Total amount of organic solvents |  | 17.7 | 17.7 | 17.7 | 17.7 | 17.7 | 17.7 | 17.7 | 17.7 | 17.7 | 17.7 |
| Proportion (%) of resin with respect to pigment |  | 70.7 | 72.4 | 77.6 | 71.7 | 72.4 | 72.4 | 55.2 | 63.8 | 60.3 | 81 |
| Evaluation | Transfer resistance | B | A | A | A | B | B | A | A | C | A |
|  | Printing density | A | A | B | A | A | A | A | A | A | C |
|  | Intermittent printing capability | A | A | B | B | A | A | A | A | A | C |

|  |  |  | Comparative Example |  |  |  |  |  |  |  |
|---|---|---|---|---|---|---|---|---|---|---|
|  |  |  | 3 | 4 | 5 | 6 | 7 | 8 | 9 | 10 |
|  | Pigment |  | 5.6 | 6.2 | 5.8 | 5.8 | 5.8 | 5.8 | 5.8 | 5.8 |
|  | Styrene-acrylic resin | Resin A (TG-5° C.) | 4 | 4.5 | — | — | — | — | — | 4.2 |
|  |  | Resin B (TG10° C.) | — | — | — | — | — | — | — | — |
|  |  | Resin C (TG36° C.) | — | — | — | — | — | — | — | — |
|  |  | Resin D (TG60° C.) | — | — | 4.2 | — | — | — | — | — |
|  |  | Resin E (TG80° C.) | — | — | — | 4.2 | — | — | — | — |
|  |  | Resin F (TG100° C.) | — | — | — | — | 4.2 | — | — | — |
|  | Urethane-based resin | Resin G (TG-30° C.) | — | — | — | — | — | 2.9 | — | — |
|  |  | Resin H (TG40° C.) | — | — | — | — | — | — | 3.2 | — |
|  | Organic solvent | Triethylene glycol monobutyl ether | 2 | 2 | 2 | 2 | 2 | 2 | 2 | 2 |
|  |  | 1,2-hexanediol | 1.8 | 1.8 | 1.8 | 1.8 | 1.8 | 1.8 | 1.8 | 1.8 |
|  |  | 2-pyrrolidone | 3 | 3 | 3 | 3 | 3 | 3 | 3 | 3 |

TABLE 1-continued

|  |  | | | | | | | | |
|---|---|---|---|---|---|---|---|---|---|
|  | Triethylene glycol | 3 | 3 | 3 | 3 | 3 | 3 | 3 | 3 |
|  | Glycerol | 7 | 7 | 7 | 7 | 7 | 7 | 7 | 12 |
|  | Propylene glycol | 0.9 | 0.9 | 0.9 | 0.9 | 0.9 | 0.9 | 0.9 | 0.9 |
| Surfactant | SURFYNOL | 0.2 | 0.2 | 0.2 | 0.2 | 0.2 | 0.2 | 0.2 | 0.2 |
|  | OLFINE | 1 | 1 | 1 | 1 | 1 | 1 | 1 | 1 |
| Water |  | Remainder | Remainder | Remainder | Remainder | Remainder | Remainder | Remainder | Remainder |
| Total amount of pigment and resin |  | 9.6 | 10.7 | 10 | 10 | 10 | 8.7 | 9 | 10 |
| Total amount of organic solvents |  | 17.7 | 17.7 | 17.7 | 17.7 | 17.7 | 17.7 | 17.7 | 22.7 |
| Proportion (%) of resin with respect to pigment |  | 71.4 | 72.6 | 72.4 | 72.4 | 72.4 | 50 | 55.2 | 72.4 |
| Evaluation | Transfer resistance | B | A | C | C | C | C | C | A |
|  | Printing density | C | C | A | A | A | A | A | B |
|  | Intermittent printing capability | A | B | A | A | A | A | A | C |

Preparation of Pressure-Adhesion Base Paper for Ink Jet Recording

Pressure-adhesion base paper for ink jet recording was prepared by a method described in Example 1 of JP-A-2014-104642. A specific method for preparation will be shown below.

Preparation of Pressure-Sensitive Adhesive Composition

As fine particle filler, 100 parts by mass of precipitated silica ("Carplex FPS101" manufactured by Evonic Degussa Japan) having an oil absorption of 140 ml/100 g was added to and sufficiently dispersed in water. Next, a pressure-sensitive adhesive composition was prepared by mixing 25 parts by mass of completely-saponified polyvinyl alcohol ("POVAL V" manufactured by JAPAN VAM & POVAL CO., LTD.) as binder and 120 parts by mass of natural rubber-based latex (SAIVINOL FB943 manufactured by SAIDEN CHEMICAL INDUSTRY CO., LTD.) obtained by polymerizing a natural rubber with methyl methacrylate as a non-peelable pressure-sensitive adhesive, and further adding 10 parts by mass of magnesium sulfate thereto.

Preparation of Pressure-Adhesion Base Paper for Ink Jet Recording

The prepared pressure-sensitive adhesive composition was applied, by an air knife coater, on both surfaces of form paper having a weight per square meter of 113 g/m² such that the amount of application on each surface is 6.0 g/m² in terms of dry weight, and the form paper was further dried to produce pressure-adhesion base paper for ink jet recording in which pressure-sensitive adhesion layers are formed on both surfaces of the form paper.

Recording

In a room of a temperature of 23° C. and a humidity of 50%, the respective ink-jet ink compositions of Examples and Comparative Examples were attached to a pressure-sensitive adhesion layer-formed surface of the pressure adhesion base paper for ink jet recording by an ink jet system by using an ink jet recording apparatus "Truepress Jet520" manufactured by Dai Nippon Screen, and thus a recorded product of a roll shape was obtained. Next, the obtained recorded product of a roll shape was cut into a size of a postcard having a width of about 10 cm. Then, the pressure-sensitive adhesion layer-formed surface was brought into contact with a pressure-sensitive adhesion layer-unformed surface, and the pressure-sensitive adhesion layer-formed surface and the pressure-sensitive adhesion layer-unformed surface were subjected to roller pressurization to perform pressure adhesion. In this roller pressurization, a recorded product having a width of 10 cm was subjected to roller treatment in a condition setting a gap of a roll sealer to about 130 μm by using a dry sealer ("PRESSLE econo" manufactured by TOPPAN FORMS CO., LTD.).

Transfer Resistance

The pressure-sensitive adhesion layer-formed surface and the pressure-sensitive adhesion layer-unformed surface were slowly peeled apart by hand 24 hours after the pressure adhesion. The amount of ink transferred to the pressure-sensitive adhesion layer-unformed surface opposing the pressure-sensitive adhesion layer-formed surface to which the ink-jet ink composition has been attached was visually observed after the peeling, and the transfer resistance was evaluated in accordance with the following evaluation criteria.

Evaluation Criteria

A: No transfer was observed, or no transfer was prominent.

B: Slight transfer was observed.

C: Transfer was prominent.

Color Developing Properties

An optical density (OD) value of a fully-printed portion of the recorded product was measured by using a Gretag density meter (manufactured by Gretag Macbeth), and printing density was evaluated in accordance with the following evaluation criteria.

Evaluation Criteria

A: The OD value was greater than 1.3.

B: The OD value was greater than 1.2 an equal to or smaller than 1.3.

C: The OD value was equal to or smaller than 1.2.

Intermittent Printing Capability

An ink jet printer ("model number PX-G930" manufactured by Seiko Epson Corporation) was filled with the aqueous ink-jet ink composition obtained in the manner described above, and was caused to intermittently transport a head carriage while performing flushing at a frequency of once per 0.7 second. Evaluation was made as follows on the basis of a printing state in flushing after 17 minutes.

Evaluation Criteria

A: Ejection was observed in flushing after idle driving for a predetermined time.

B: Misdirection was observed in flushing after idle driving for a predetermined time.

C: Ejection was not observed in flushing after idle driving for a predetermined time.

As obvious from comparison between Example 1 and Comparative Example 1, the results showed that the transfer resistance was poorer when the ratio of the resin to the pigment was below a specific value. In addition, as obvious from comparison between Examples 5 and 6 and Comparative Examples 5 and 6, the results showed that the transfer resistance was poorer when the glass transition temperature of the resin was above a specific value.

As obvious from comparison between Example 2 and Comparative Example 3, the results showed that the color developing properties were poorer when the content of the pigment in the ink-jet ink composition was below a specific value. In addition, as obvious from comparison between Example 3 and Comparative Example 2 and comparison between Example 4 and Comparative Example 4, the results showed that the color developing properties were poorer when the total content of the pigment and the resin in the ink-jet ink composition was above a specific value. Further, as obvious from comparison between Example 2 and Comparative Example 10, the results showed that the color developing properties were improved when the content of the organic solvent in the ink-jet ink composition was equal to or lower than a specific value.

As obvious from comparison between Example 3 and Comparative Example 2 and comparison between Example 4 and Comparative Example 4, the results showed that the intermittent printing capability was poorer when the total content of the pigment and the resin in the ink-jet ink composition was above a specific value. In addition, as obvious from comparison between Example 2 and Comparative Example 10, the results showed that the intermittent printing capability was poorer when the content of the organic solvent in the ink-jet ink composition was above a specific value.

The entire disclosure of Japanese Patent Application No. 2018-040839, filed Mar. 7, 2018 is expressly incorporated by reference herein.

What is claimed is:

1. An ink-jet ink composition for a pressure-adhesion recording target medium, the ink-jet ink composition comprising a pigment, a resin, an organic solvent, a surfactant, and water,
   wherein the content of the pigment is 5.7% by mass or more with respect to the entirety of the ink-jet ink composition,
   wherein the total content of the pigment and the resin is 10.3% by mass or less with respect to the entirety of the ink-jet ink composition,
   wherein the content of the organic solvent is 5% by mass or more and 20% by mass or less with respect to the entirety of the ink-jet ink composition,
   wherein the organic solvent contains a monoalkyl ether of polyol,
   wherein the content of the monoalkyl ether is 0.5% by mass or more and 5.0% by mass or less with respect to the entirety of the ink-jet ink composition, and
   wherein the resin satisfies a condition (a) or (b) below
   (a) the resin contains a styrene-acrylic resin having a glass transition temperature of 36° C. or lower, and the content of the styrene-acrylic resin is 70 parts by mass or more with respect to 100 parts by mass of the pigment;
   (b) the resin contains a urethane-based resin having a glass transition temperature of 36° C. or lower, and the content of the urethane-based resin is 55 parts by mass or more with respect to 100 parts by mass of the pigment.

2. The ink-jet ink composition for a pressure-adhesion recording target medium according to claim 1, wherein the pigment contains an anionic self-dispersive pigment having an anionic functional group on a surface thereof.

3. The ink-jet ink composition for a pressure-adhesion recording target medium according to claim 1,
   wherein the organic solvent contains an alkanediol having 6 to 8 carbon atoms and propylene glycol,
   wherein the content of the alkanediol is 0.5% by mass or more and 5.0% by mass or less with respect to the entirety of the ink-jet ink composition, and
   wherein the content of the propylene glycol is 0.5% by mass or more and 5.0% by mass or less with respect to the entirety of the ink-jet ink composition.

4. The ink-jet ink composition for a pressure-adhesion recording target medium according to claim 1, wherein the surfactant contains an acetylene-based surfactant.

5. A recorded product forming method comprising:
   attaching the ink-jet ink composition for a pressure-adhesion recording target medium according to claim 1 to a recording target medium by an ink jet system to form an image; and
   sticking together, by pressure-sensitive pressure adhesion, a pair of surfaces including an image-formed surface of the recording target medium on which the image has been formed by the attaching to form a recorded product in which the image is concealed from an outside.

6. A recorded product forming method comprising:
   attaching the ink-jet ink composition for a pressure-adhesion recording target medium according to claim 2 to a recording target medium by an ink jet system to form an image; and
   sticking together, by pressure-sensitive pressure adhesion, a pair of surfaces including an image-formed surface of the recording target medium on which the image has been formed by the attaching to form a recorded product in which the image is concealed from an outside.

7. A recorded product forming method comprising:
   attaching the ink-jet ink composition for a pressure-adhesion recording target medium according to claim 3 to a recording target medium by an ink jet system to form an image; and
   sticking together, by pressure-sensitive pressure adhesion, a pair of surfaces including an image-formed surface of the recording target medium on which the image has been formed by the attaching to form a recorded product in which the image is concealed from an outside.

8. A recorded product forming method comprising:
   attaching the ink-jet ink composition for a pressure-adhesion recording target medium according to claim 4 to a recording target medium by an ink jet system to form an image; and
   sticking together, by pressure-sensitive pressure adhesion, a pair of surfaces including an image-formed surface of the recording target medium on which the image has been formed by the attaching to form a recorded product in which the image is concealed from an outside.

9. The recorded product forming method according to claim 5, wherein a pressure-sensitive adhesion layer is formed on at least one of the pair of surfaces, and the pressure-sensitive adhesion layer contains at least one of a polyvalent metal salt and a cationic resin.

10. The recorded product forming method according to claim 6, wherein a pressure-sensitive adhesion layer is formed on at least one of the pair of surfaces, and the pressure-sensitive adhesion layer contains at least one of a polyvalent metal salt and a cationic resin.

11. The recorded product forming method according to claim 7, wherein a pressure-sensitive adhesion layer is formed on at least one of the pair of surfaces, and the pressure-sensitive adhesion layer contains at least one of a polyvalent metal salt and a cationic resin.

12. The recorded product forming method according to claim 8, wherein a pressure-sensitive adhesion layer is formed on at least one of the pair of surfaces, and the pressure-sensitive adhesion layer contains at least one of a polyvalent metal salt and a cationic resin.

13. The recorded product forming method according to claim 9, wherein the polyvalent metal salt contains magnesium sulfate, and the cationic resin contains a polyamine epichlorohydrin resin.

14. The recorded product forming method according to claim 10, wherein the polyvalent metal salt contains magnesium sulfate, and the cationic resin contains a polyamine epichlorohydrin resin.

15. The recorded product forming method according to claim 11, wherein the polyvalent metal salt contains magnesium sulfate, and the cationic resin contains a polyamine epichlorohydrin resin.

16. The recorded product forming method according to claim 12, wherein the polyvalent metal salt contains magnesium sulfate, and the cationic resin contains a polyamine epichlorohydrin resin.

17. An ink-jet ink composition for a pressure-adhesion recording target medium, the ink-jet ink composition comprising a pigment, a resin, an organic solvent, a surfactant, and water,
wherein the content of the pigment is 5.7% by mass or more with respect to the entirety of the ink-jet ink composition,
wherein the total content of the pigment and the resin is 10.3% by mass or less with respect to the entirety of the ink-jet ink composition,
wherein the content of the organic solvent is 5% by mass or more and 20% by mass or less with respect to the entirety of the ink-jet ink composition,
wherein the organic solvent contains an alkanediol having 6 to 8 carbon atoms and propylene glycol,
wherein the content of the alkanediol is 0.5% by mass or more and 5.0% by mass or less with respect to the entirety of the ink-jet ink composition,
wherein the content of the propylene glycol is 0.5% by mass or more and 5.0% by mass or less with respect to the entirety of the ink-jet ink composition, and
wherein the resin satisfies a condition (a) or (b) below
(a) the resin contains a styrene-acrylic resin having a glass transition temperature of 36° C. or lower, and the content of the styrene-acrylic resin is 70 parts by mass or more with respect to 100 parts by mass of the pigment;
(b) the resin contains a urethane-based resin having a glass transition temperature of 36° C. or lower, and the content of the urethane-based resin is 55 parts by mass or more with respect to 100 parts by mass of the pigment.

* * * * *